K. O. SCHAUMAN.
IMPACT ACTUATED CONTROL MECHANISM FOR VEHICLES.
APPLICATION FILED APR. 5, 1920.

1,418,678.

Patented June 6, 1922.

WITNESS

INVENTOR
K. O. Schauman
BY
ATTORNEYS

UNITED STATES PATENT OFFICE.

KARL OSTEN SCHAUMAN, OF SAN FRANCISCO, CALIFORNIA.

IMPACT-ACTUATED CONTROL MECHANISM FOR VEHICLES.

1,418,678.  Specification of Letters Patent.  Patented June 6, 1922.

Application filed April 5, 1920. Serial No. 371,383.

*To all whom it may concern:*

Be it known that I, KARL OSTEN SCHAUMAN, citizen of Sweden, residing in the city and county of San Francisco and State of California, have invented certain new and useful Improvements in Impact-Actuated Control Mechanism for Vehicles, of which the following is a specification.

The present invention relates to a safety attachment adapted for application to motor vehicles, whereby the vehicle is automatically brought to a stop after the same has collided with an object, such as another vehicle, pedestrian or the like, thereby insuring the stopping of the vehicle after a collision.

A further object of the invention is to automatically assist the vehicle operator to bring a vehicle to a point of rest after a collision, thereby minimizing the damage resulting from the collision.

The invention consists primarily in incorporating, preferably at the front end of the vehicle in connection with a bumper, suitable contact members controlling a circuit which is provided with means for actuating a switch mechanism in the ignition circuit of the vehicle on the making of the contacts, due to the compression of the bumper, whereby the ignition circuit of the vehicle is automatically broken or interrupted enabling the compression of the motor to assist in retarding the momentum of the vehicle.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings, wherein—

Figure 1:
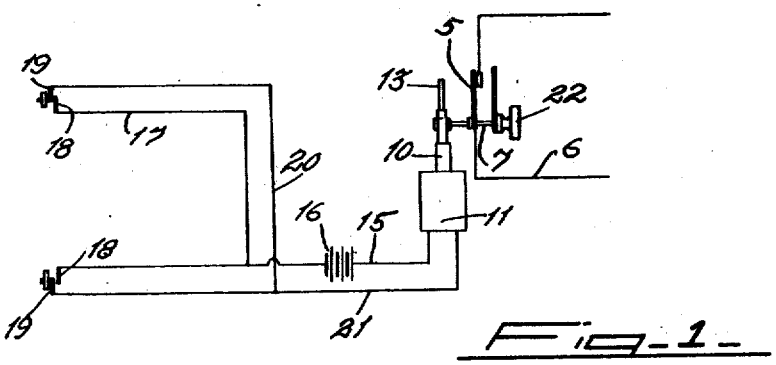
Fig. 1 is a diagrammatic view of the controlling circuit incorporated with the preferred embodiment of my invention.
Figure 2:
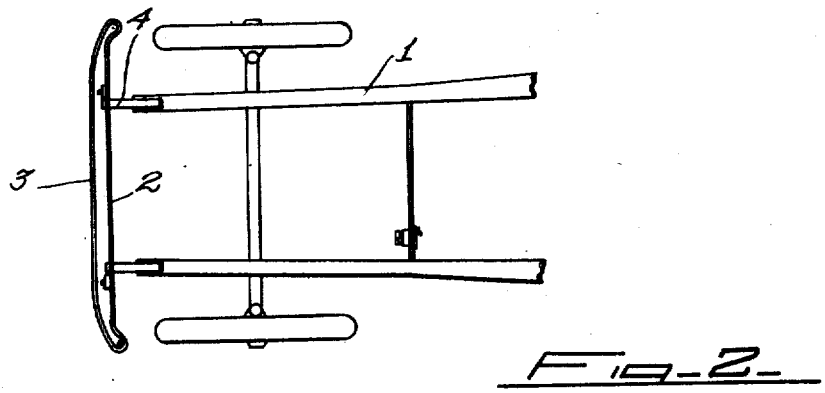
Fig. 2 is a view in top plan of the forward end of the vehicle, illustrating a bumper having the circuit controlling contacts.
Figure 3:
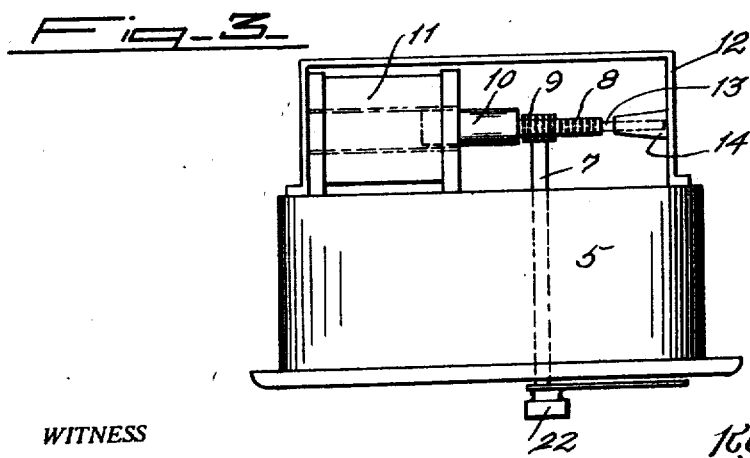
Fig. 3 is a view in side elevation of the circuit actuated solenoid associated with the vehicle ignition circuit switch.

Referring more particularly to the drawings, wherein like characters of reference designate corresponding parts, I secure to the forward end of the vehicle frame 1 a suitable spring bumper, consisting preferably of the stationary portion 2 and the spring impact portion 3, the bumper illustrated being the conventional loop end type of bumper secured to the forward ends of the vehicle frame by the supporting brackets 4.

I provide any suitable form of controlling switch 5 in the ignition circuit 6 of the vehicle, and to the movable portion or shaft 7 of the switch 5 I associate an automatic operating member, illustrated in the present case as consisting of a rack 8 engaging a pinion 9 secured to the shaft 7. The rack extends from the end of a solenoid 10 which operates within an armature 11 supported by a frame 12 preferably on the rear of the switch 5. The outer end of the rack 8 carries a guide stem 13 extending into a guide 14 carried by the frame 12. The solenoid 11 is controlled by a suitable electric circuit, consisting of the lead 15, within which is mounted a source of power 16, and which branches into leads 17 terminating in contact points 18, associated preferably with the stationary portion 2 of the bumper.

Disposed adjacent the contacts 18 and normally in spaced relation thereto are movable contacts 19 preferably disposed in co-operation with the movable member 3 of the bumper, and from said contacts 19 extend the leads 20 connecting with the lead 21, which, in turn, connects with the armature 11, as does the end of the lead 15.

It will be observed that on the making of the contacts 18 and 19 the armature 11 is energized, withdrawing the core 10 therein, which automatically rotates the shaft 7, causing the switch 5 to break the ignition circuit 6, thus interrupting the ignition circuit of the motor and assisting the vehicle to be brought to a point of rest by the motor compression.

If desirable, an operating stem 22 associated with the shaft 7 may be provided within convenient reach of the operator, or at any suitable point on the vehicle, whereby the switch 5, after the contacts 19 and 18 are broken, may be restored to closed position, completing the ignition circuit 6, at which time it is possible to again operate the motor.

It will be readily understood that the present device serves as a safety for pedestrians and other vehicles with which the vehicle equipped might collide, in that it enables the equipped vehicle to be automatically brought to stopped position, and assists the driver of an equipped vehicle in bringing his vehicle to a point of rest by the compression of the motor added to his brake applying effort.

Having thus described my invention, what I claim as new and desire to protect by Letters Patent is:—

A safety device for motor vehicles, the same comprising an electric circuit, an ignition circuit for the vehicle motor and a switch therein, a bumper associated with the vehicle and having normally separated contacts forming a portion of said circuit and normally interrupting the same, an electromagnet in said electric circuit, an operating connection between the core thereof and said ignition switch, said core adapted on the closing of said circuit by the making of said bumper contacts to operate the ignition switch to break said circuit.

In testimony whereof I have signed my name to this specification.

KARL OSTEN SCHAUMAN.